United States Patent Office 2,958,141
Patented Nov. 1, 1960

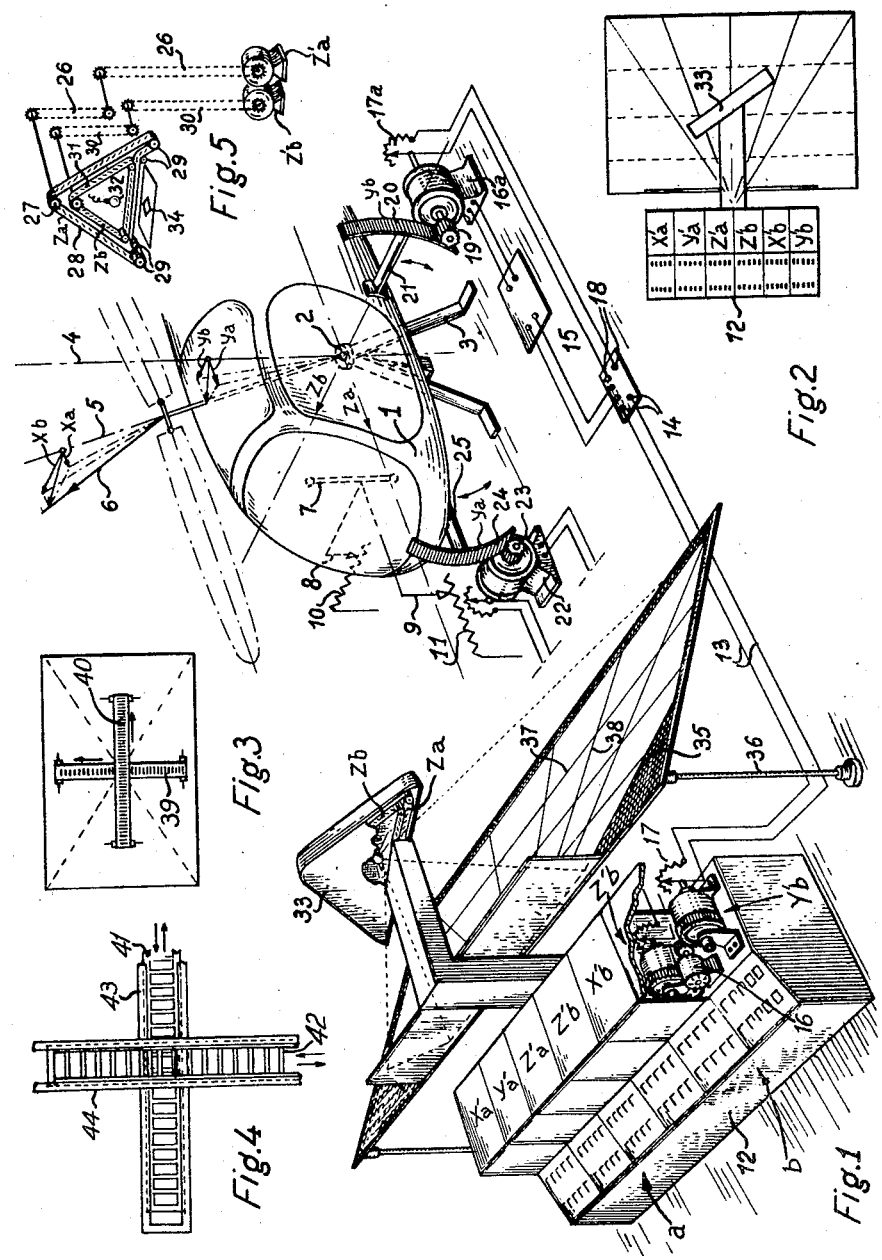

2,958,141

HELICOPTER SIMULATING SYSTEM, IN PARTICULAR FOR STUDYING HOVERING FLIGHT

René Dorand, Paris, France, assignor to Giravions Dorand, Seine, France, a company of France Filed June 30, 1954, Ser. No. 440,385

Claims priority, application France June 4, 1954

5 Claims. (Cl. 35—12)

This invention relates to a simulating system for reproducing the natural motions, as well as the behaviour in response to piloting orders, of a helicopter, either for studying a particular prototype or an ancillary device, such as a stabilizing system, an automatic pilot, etc., or for training a pilot, in particular, in hovering flight.

The invention has for its purpose to provide a simulating system of this type, in which a pilot is subjected to positional and optical conditions, capable of giving him the perfect illusion of real flight.

An object of the invention is therefore to provide a helicopter simulating system comprising a simulated cockpit mounted on a swivel-pivot of a fixed support, in which a pilot may be subjected to the same sensations as if he were undergoing pitch and rolling variations in an actual helicopter.

A more particular object of the invention is to provide a simulating system of this type, wherein the pitch and rolling displacements of the simulated cockpit are controlled, through a follow-up system, from a calculating machine adapted to reproduce with the highest accuracy the pitch and rolling accelerations an actual cockpit would undergo in response to natural motions inherent with the real helicopter or in response to actuation of a simulated pilot stick provided in the cockpit either by the pilot himself or by an automatic pilot system or the like.

Any suitable, e.g. analogue or digital electronic computing machine, capable of simultaneously resolving two systems of differential equations of second degree may be used for the above mentioned purposes.

However, it is a particular object of the invention to combine the above described simulating system with a calculating machine of the type described in the co-pending application filed by the inventor for "Double-Integrating Unit, Electro-Mechanical Computer Comprising Such Units and Simulating Apparatus Controlled by Such Computers, Ser. No. 440,384, filed June 30, 1954, now Patent No. 2,911,151.

Now, even in hovering flight, an actual helicopter undergoes slight longitudinal and lateral displacements of more or less considerable amplitude, in particular, when the pilot is not sufficiently trained.

Another object of the invention is to complete the above described simulating system by means for projecting an image capable of giving to the pilot an optical illusion of such displacements.

A more specific object of the invention is to project on a screen that is suitably inclined to give perspective illusion and disposed in front of the simulated cockpit a grid-like image, the lateral bars of which are moved longitudinally towards the simulated cockpit to simulate a forward displacement of the helicopter and vice-versa, while the longitudinal bars of said grid converge towards a vanishing point simulating the horizon and are rotated, e.g. clockwise, about said point to simulate a lateral displacement of the helicopter towards the right.

A more particular object of the invention is to provide a system of the type described, wherein the above mentioned projection is effected by means of ruled films or ladder-shaped slidable elements located at right-angles with each other in a cross-like configuration, through both of which is passed the projecting beam and each of which is controlled from the above-mentioned calculating machine and, e.g., from the shaft of the follower fly-wheel of the relevant double-integrating unit of the calculating machine described in the above cited patent application.

Other objects and advantages of the invention will be better understood with reference to the following description together with the appended drawings submitted for purposes of illustration only and not intended to define the scope of the invention.

In these drawings:

Fig. 1 is a schematic perspective view of a helicopter simulating system according to the invention, provided with a calculating machine as described in the above cited co-pending patent application, Fig. 2 is a general reduced plan view showing the relative arrangement of the projector and screen, Fig. 3 shows an alternative arrangement of the projection films.

Fig. 4 shows an alternative construction of the projecting device, and

Fig. 5 shows the details of a drive provided for actuating a projecting device, as shown in Fig. 1, from the calculating machine of the same figure.

The simulated cockpit 1 of the simulating system according to the invention is mounted on a swivel-pivot 2 of a fixed support 3. The axis 4 designates the vertical of the swivel-pivot 2. The axis 5 represents that of the actual rotor-carrying mast, while the vector 6 indicates the resultant of the aerodynamic forces which would act in actual flight on said rotor. $Za$ is the rolling axis and $Zb$ is the pitch axis.

There is shown at 7 a simulated pilot stick acting upon the movable contacts 8 and 9 of two potentiometers 10 and 11, respectively, each of which controls the input circuit of the galvanometer frame of one of the double-integrating units of the calculating machine 12, as described in detail hereunder.

The conditions of hovering flight of a helicopter are, at every moment, determined by the following values and by their first and second derivatives:

First, the inclination of the rotor-carrying mast with respect to the vertical at the center of gravity of the real cockpit. This value actually exists in the simulating device according to the invention, the center of gravity being the point 2 of the simulating device. It can be evaluated by the two values $Ya$ and $Yb$, representing the inclination with respect to the pitch and roll axes.

Second, the horizontal distances of the center of gravity of the real helicopter, corresponding to the point 2 in the simulating device, to the roll and pitch axes at the stationary point of hovering flight.

These values do not actually exist in the simulating device according to the invention, since the point 2 is unmovable. They still exist for the pilot in the simulated cockpit, in the shape of a projection on a screen of an image or of a grid, of which the relative displacement of the screen, gives to the pilot the illusion of the variations of the said distances.

Third, the inclination with respect to the rotor-carrying mast of the resultant of the aerodynamic forces acting on the real helicopter. This value does not exist in the simulating device, as there are no aerodynamic forces applied to the simulated cockpit. But since the value of the said inclination is a function of the first two values and their derivatives, the values of the said inclination, though not directly appreciated by the pilot, are acting through the calculating machine, on the operations of the same. This inclination can be determined by two values, Xa and Xb, representing the projections of the said resultant on the axis of the rotor-carrying mast.

The calculating machine 12 essentially comprises two computers a and b assigned, the first one, to pitch and longitudinal displacement simulation and the other, to rolling and lateral displacement simulation; each of said computers a and b is provided with three double-integrating units, assigned to the above mentioned values; the units $X'a$, $Y'a$ and $Z'a$ of the first computer to the values Xa, Ya and Za, and the units $X'b$, $Y'b$ and $Z'b$ of the second one to the values Xb, Yb and Zb.

The dynamic potentiometer 17 of the double-integrating unit $Y'b$ is connected through conductors 13 to the input terminals 14 of a follow-up device generally designated at 15. Said follow-up device comprises an independent electric motor 16a. There is shown at 17a a potentiometer provided for returning current back to terminals 18 of the follow-up device 15. The latter may be a positional follow-up system of any type. An example of a suitable loop follow-up system that is well adapted for this purpose has been described in "Principles of servo-mechanisms" by G. S. Brown and D. I. Campbell, New York 1948, page 3 and following pages. The output shaft of motor 16a carries a pinion 19 meshing for example, with a toothed segment 20; fixedly secured, through a supporting member 21, on the cockpit 1.

Similarly, the dynamic potentiometer, not shown, of the unit $Y'a$ feeds through a second follow-up system, e.g. of the same type as the first one, a second independent electric motor 22, the output shaft of which carries a pinion 23 meshing, e.g. with a toothed segment 24 fixedly secured, through a support 25, on the cockpit 1.

It is to be clearly understood that the device used for imparting inclination of the simulated cockpit from the calculating machine which have been described hereabove are given as a mere illustration and may be constituted as well by any suitable mechanisms such as cranks and connecting-rods, chain drives and so on.

It is essential to establish such a transmission between the follower fly-wheel of the integrating unit $Y'b$ of the calculating machine, and the simulated cockpit, that the said cockpit will assume at every moment the same angular positions as the said fly-wheel, with respect to the roll axis, determined by Yb, and vice-versa. That is, if one imparts a rotary movement to the said fly-wheel, the simulated cockpit will execute a similar movement.

The same is true for the integrating unit $Y'a$ and the pitch angular position determined by Ya.

The output of the double integrating unit $Z'a$ of the calculating machine, actuates, e.g. through a pinion chain drive 26, a toothed roller 27 meshing with the marginal perforations of a continuous film 28 that further runs over tightening rollers 29. Similarly, the output of the unit $Z'b$ drives through pinions and chains 30 a second film 31 similar to the first one and innerly concentric therewith. Both films 28 and 31 are provided with parallel and equidistant rulings, the rulings of the film 28 being at right-angles to those of film 31 and both rulings being inclined by 45° with respect to the longitudinal axis of the films. A projector 32, fixed in the example shown, and housed within a projection lantern 33 illuminates both films and ensures a simultaneous projection of the same through a rectangular window 34 on a screen 35, mounted in an inclined position on a fixed support 36. The relative arrangement of the films and the window 34 is such that the projection is limited to a rectangular image having substantially the same size as the screen and presenting the shape of a grid having transverse bars 37 corresponding to the rulings of the film 28 and longitudinal bars 38 corresponding to the rulings of film 31. Due to the inclination of the screen 35, the longitudinal bars 38 converge towards a same vanishing point that simulates the horizon of the pilot. In order to obtain the transverse and longitudinal bars from the rulings inclined by 45°, the projection lantern 33 is also inclined by 45° with respect to the longitudinal axis Za, as more clearly shown in Fig. 2.

The projecting device described above may be affected with many minor modifications within the scope of the invention. Thus, for example, there is shown in Fig. 3 an alternative arrangement in which two films 39 and 40 disposed at right-angles with one another and parallel to the longitudinal and lateral axes Za and Zb are provided with parallel and equidistant rulings right-angled with their longitudinal axis, so that their simultaneous projection reproduces the bars 37—38.

According to another alternative embodiment shown in Fig. 4, the above described films may be substituted for, in particular in the example shown in which the simulating system is intended for studying hovering flight, i.e., in which the lateral and longitudinal displacements are inherently limited, by ladder-shaped structures 41 and 42 arranged in a cross-like configuration and sliding in guides 43—44 under the control of the output of the double-integrating units $Z'a$ and $Z'b$, through suitable drives, not shown.

The above described simulating system operates as follows:

The connections between the input and output elements of the machine and the regulation of its operative parts, are described in the copending application cited above, and are such as to impart to the output members of the said machine angular displacements which, transmitted to the simulated cockpit, will give the same such pitch and roll angular displacements as a real cockpit of a real helicopter would have, if submitted to the flight-conditions similar to those corresponding at every moment to the input angular values hereabove mentioned. In fact, as the angular values, hereabove determined, to be similar to those of the real helicopter in real flight must, at every moment, verify the two systems of differential equations of second degree which are representing the small motions at a constant altitude, of a helicopter in hovering flight conditions, each system having three variables, the said calculating machine must have three double-integrating units, comprising therefore six inputs and six outputs. The connections between all inputs and outputs and the regulation of the machine must be established inside the calculating machine, with respect to the particular co-efficients characterizing the type of the simulated helicopter, so as to permit the said machine to serve the above defined purposes, the said connections between the output and input elements of the calculating machine being as if all the values given by the calculating machine outputs were really existing and as such transmitted to the input elements of the said machine.

The above mentioned adjustable coefficients inherent with each particular type of helicopter may affect each variable and/or its first derivative and/or its second derivative. Such coefficients are combined with voltages identifying these various parameters, by means of setting potentiometers, as described in the already mentioned copending patent application.

In the simulating system described above, for each motion imparted by the pilot to the stick 7, there are particular values of the six above mentioned variables, which resolve the six simultaneous equations of the helicopter simulated for the values of the relevant functions of time which are determined by said motion of the stick. Two of said variables Ya and Yb determine a certain inclination in space of the cockpit 1, through the two follow-up devices 15, whereby the pilot is subjected to the same pitch and rolling effects as if he were acting on the stick of an actual helicopter of the same type. Moreover, two other variables Za and Zb determine a variation of the image pattern of the grid projected on the screen 35, which gives to the pilot the illusion of a horizontal displacement, the longitudinal and lateral components of which correspond to the values of Za and Zb, respectively.

Finally, as indicated above, all variables as well as the first derivatives of the same may be recorded to permit analysis of the variations of the inclination of the aerodynamic resultant with respect to the rotor axis of an actual helicopter of the same type, as that simulated, as well as analysis of the various speeds of the above-mentioned angular and linear displacements and that of the said displacements proper.

It is to be understood that the invention is in no way limited to the examples described and shown and that it is subject to various modifications within the reach of those skilled in the art and without departing from the scope of the invention.

In particular, while the invention is particularly well adapted to the studying of hovering flight, it is obvious that the above described simulating system can be easily completed, within the scope of the invention, with means for giving, moreover, to the pilot, the illusion of a horizontal and/or vertical flight. For this purpose, it would suffice, for example, to give a continuous feed motion to the film projecting the lateral bars of the grid and/or to displace the projecting apparatus vertically to simulate an ascent or a descent of the helicopter.

What is claimed is:

1. A device for simulating pitch and roll motions of a real helicopter cockpit, in hovering flight conditions at a constant altitude around the point of intersection of its pitch and roll axes as well as horizontal deviations of said helicopter from the theoretically fixed point of hovering flight, under the action of the forces resulting from said flight conditions and in response to actuation of a pilot-stick adapted to vary said action by operating control surfaces, said device comprising, in combination, a fixed support, a simulated cockpit, a swivel joint to pivot said cockpit on said support around the point of intersection of two axes corresponding to said real cockpit pitch and roll axes, a fixed screen disposed in front of said cockpit, means including a projecting apparatus to project, on said screen, an image comprising a first series of movable elements to simulate the component of said horizontal deviations in a direction parallel to said pitch axis and a second series of movable elements to simulate the component of said horizontal deviations in a direction parallel to said roll axis, a computer of a type capable at every moment of imparting through transmission means to said simulated cockpit, about said pivot point, pitch and roll angular accelerations equal to those which would be imparted by said forces to said helicopter real cockpit, said machine being, furthermore, capable of giving, at every moment, two outputs varying as a function of said components, a simulated pilot-stick mounted in said simulated cockpit, means responsive to the actuation of said simulated pilot-stick for deriving variable control quantities, means to transmit the said control quantities to the said computer to vary the action of the same on the said simulated cockpit as well as the values of said outputs, and means operatively connected with said projecting means to move said first and second series of movable image elements in response to variations of said outputs, the said control quantities being such that the action of the simulated pilot-stick on the simulated cockpit as well as the projection of said image, through the computer, are similar to the action that the real pilot-stick would exert, in similar to conditions, on the real cockpit, through the real helicopter control surfaces, and to the image which would appear in corresponding operation of a real helicopter, respectively.

2. A simulating device according to claim 1, wherein said projecting means comprise two superposed films illuminated from said projecting apparatus and each driven under the control of one of said outputs, each one of said films being provided with a ruling consisting of equidistant and parallel lines, the lines of the ruling of one of said films being at right-angles to those of the other and said projecting apparatus being so disposed with respect to said screen that the grid projected through said films on said screen is composed of parallel lateral bars and longitudinal bars converging towards a same vanishing point simulating the horizon of the pilot.

3. A simulating device according to claim 2, wherein said films are disposed concentrically and wherein the lines of said rulings are inclined by 45° with respect to the longitudinal axis of the corresponding film, said projecting apparatus being also inclined by 45° with respect to the axes of the screen.

4. A simulating device according to claim 2, wherein said films are arranged in cross-like fashion and wherein the lines of said rulings are at right-angles to the axis of said films which are in turn parallel to those of said screen.

5. A simulating device according to claim 1, wherein said projecting means comprise two superposed slidably mounted ladder-shaped elements illuminated from said projecting apparatus and each actuated under the control of one of said outputs, said elements being disposed at right-angles to each other and parallel to the axes of said screen.

References Cited in the file of this patent

UNITED STATES PATENTS

| | | |
|---|---|---|
| 2,336,436 | Beindorf | Dec. 7, 1943 |
| 2,350,351 | Grunberg | June 6, 1944 |
| 2,352,101 | Hutter | June 20, 1944 |
| 2,385,095 | McCarthy | Sept. 18, 1945 |
| 2,409,938 | Hutter | Oct. 22, 1946 |
| 2,474,096 | Dehmel | June 21, 1949 |
| 2,485,499 | Lewis | Oct. 18, 1949 |
| 2,687,580 | Dehmel | Aug. 31, 1954 |
| 2,701,922 | Dehmel | Feb. 15, 1955 |
| 2,712,184 | Ziebolz et al. | July 5, 1955 |